UNITED STATES PATENT OFFICE.

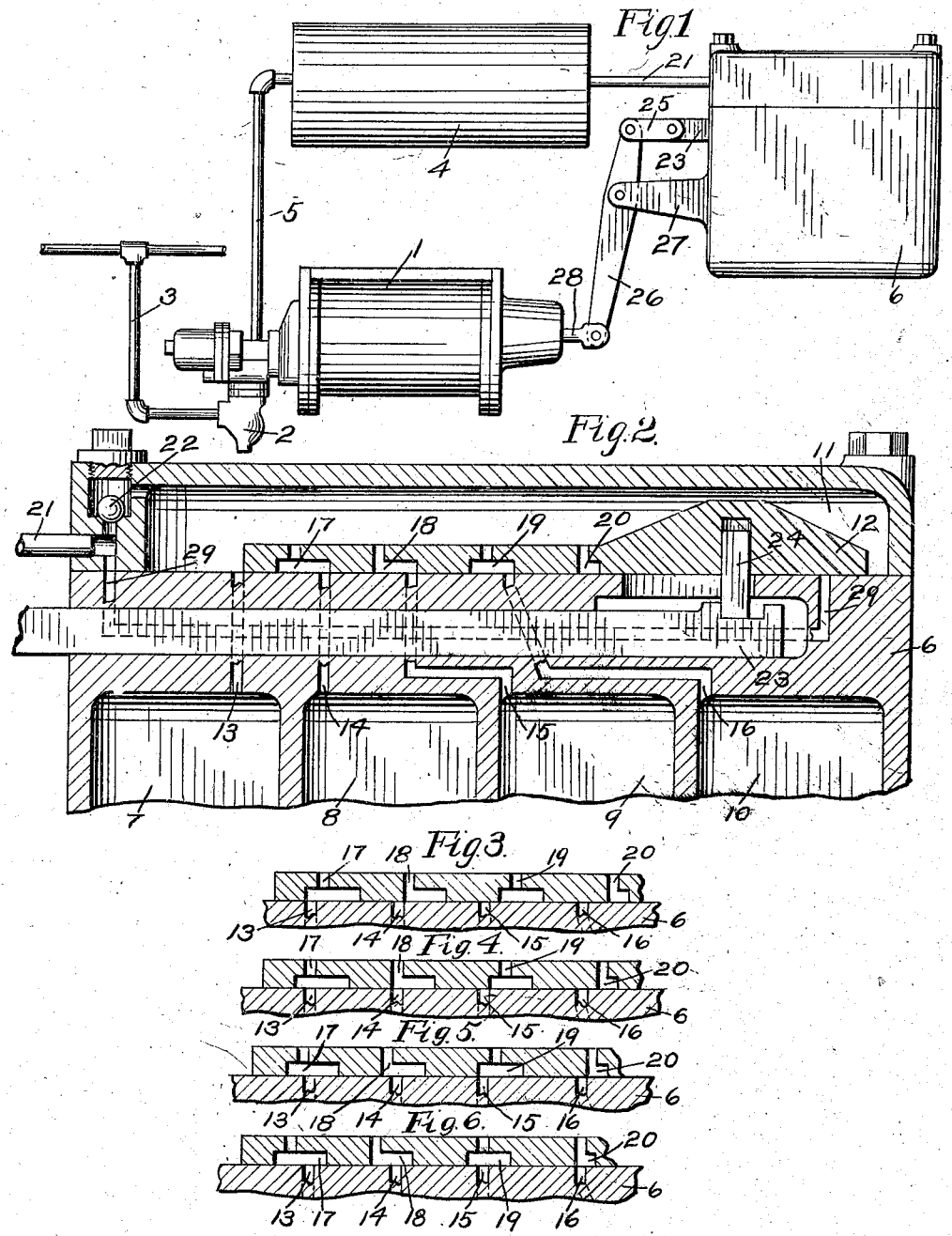

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-CYLINDER-PRESSURE REGULATOR.

1,194,442.  Specification of Letters Patent.  Patented Aug. 15, 1916.

Application filed November 30, 1915. Serial No. 64,231.

*To all whom it may concern:*

Be it known that I, WALTER V. TURNER, a citizen of the United States, residing at Wilkinsburg, in the county of Allegheny and State of Pennsylvania, have invented new and useful Improvements in Brake-Cylinder-Pressure Regulators, of which the following is a specification.

This invention relates to fluid pressure brakes, and more particularly to a device for regulating the brake cylinder pressure.

According to a prior pending application of P. H. Donovan, Serial No. 50,591, filed September 14, 1915, it is proposed to provide means for regulating the brake cylinder pressure in which the auxiliary reservoir volume is automatically varied to correspond with the brake cylinder piston travel.

The principal object of the present invention is to provide an improved brake cylinder pressure regulating device operating on the general principle of the above mentioned patent application.

In the accompanying drawing, Figure 1 is a diagrammatic view of a car air brake equipment showing my improvement applied thereto; Fig. 2 a sectional view, in part, of the brake cylinder pressure regulating valve device; and Figs. 3, 4, 5, and 6, sectional views of the pressure regulating slide valve and seat, showing the valve respectively in positions for connecting one, two, three, and four compartments with the auxiliary reservoir.

As shown in Fig. 1 of the drawing, my improvement may be applied in connection with a car brake equipment of the usual type, comprising a brake cylinder 1, a triple valve device 2 connected to brake pipe 3, and an auxiliary reservoir 4 connected to the triple valve device by pipe 5.

According to a preferred form of my invention, the brake cylinder pressure regulating valve device may comprise a casing 6 containing chambers or compartments 7, 8, 9, and 10 and a valve chamber 11 within which is mounted a slide valve 12 for controlling passages 13, 14, 15, and 16, leading respectively to the chambers 7, 8, 9, and 10, the slide valve being provided with ports 17, 18, 19, and 20. The slide valve 12 is shown diagrammatically in the drawing with the ports arranged in one plane, so that the operation may be more clearly traced, but it will be understood that in the actual construction, the ports may be arranged in different planes, so as to make the valve shorter and more compact.

The valve chamber 11 is connected to the auxiliary reservoir 4 by a pipe 21, a check valve 22 being interposed to prevent back flow from the valve chamber to the auxiliary reservoir.

The slide valve 12 is operated by means of a reciprocating bar 23 having lugs adapted to engage a pin 24 mounted in and depending from the slide valve, said bar being connected by links 25 to a lever 26 fulcrumed on lugs 27 secured to the casing 6 and adapted to be operated by the brake cylinder piston rod 28.

In operation, when the brakes are in release position, the slide valve 12 will be held in the position shown in Fig. 2 of the drawing, and fluid supplied to the auxiliary reservoir from the brake pipe in the usual manner, flows through pipe 21 and past check valve 22, charging the valve chamber 11. In the release position of the slide valve 12, passage 13 is open to valve chamber 11, and passages 14, 15, and 16 register respectively with ports 17, 18, and 19, so that the compartments 7, 8, 9, and 10 are now charged with fluid under pressure from the auxiliary reservoir. If an application of the brakes is effected, the brake cylinder piston rod 28 moves out and operates the lever 26 and the bar 23. A certain amount of lost motion is provided at the operating lugs of the bar, so that the pin 24 is not moved under the initial movement of the brake cylinder piston, say for example, a distance of three and one-half inches. Further movement of the brake cylinder piston causes the rod 23 to engage the pin 24 and move the slide valve 12 so as to lap all of the passages 13, 14, 15, and 16, and when the brake cylinder piston has moved out a predetermined amount, the slide valve will assume the position shown in Fig. 3 of the drawing, in which port 17 registers with passage 13 while the remaining passages 14, 15, and 16 are still blanked. When the slide valve 12 moves to the above position, a passage 29 leading to the auxiliary reservoir is uncovered, so that compartment 7 is connected through valve chamber 11 with the auxiliary reservoir and an increased brake cylinder pressure will be obtained for a given reduction in brake pipe pressure, corresponding with the increased volume of the auxiliary reservoir. If the brake cylinder piston moves a further predetermined distance, then the valve 12 is moved to the position shown in Fig. 4 of the drawing, in which passages 13 and 14 register respectively with ports 17 and 18, so that the compartments 7 and 8 are now connected with the auxiliary reservoir. In a similar manner, further movements of the brake cylinder piston will cause the slide valve 12 to assume the successive positions shown in Figs. 5 and 6, in which compartments 7, 8, and 9, and compartments 7, 8 9, and 10 are respectively connected to the auxiliary reservoir.

The necessary movement of the brake cylinder piston to cause the slide valve 12 to assume the different positions enumerated may be of any desired amount, but it is contemplated to have the first compartment connected when the brake cylinder piston moves out six inches, two compartments at seven inches, three at eight inches, and all four at nine inches.

One cause tending to increase the brake cylinder piston travel is the increased brake cylinder pressure incident to a heavier application of the brakes and since additional reservoir volume is cut in as the piston travel increases, means are available for increasing the flexibility of the brakes under light applications by so proportioning the reservoir volume cut in that when the application is light and the piston travel correspondingly short, the added volume will produce a brake cylinder pressure per pound of reduction in brake pipe pressure which is less than the brake cylinder pressure produced per pound of reduction in brake pipe pressure when the brake application is heavy and piston travel is greater.

The above effect is accomplished by making the compartment of constantly increasing volume in the order that they are cut in as the piston travel increases, instead of having the compartments of uniform volume.

Having now described my invention, what I claim as new and desire to secure by Letters Patent, is:

1. In a fluid pressure brake, the combination with a brake cylinder and auxiliary reservoir, of a plurality of normally charged compartments and a valve operatively connected to the brake cylinder piston for connecting one or more compartments with the auxiliary reservoir according to the brake cylinder piston travel.

2. In a fluid pressure brake, the combination with a brake cylinder containing a piston having a piston rod, and an auxiliary reservoir from which fluid is supplied to the brake cylinder, of a plurality of compartments normally charged with fluid under pressure, a valve having positions for connecting one or more of said compartments with the auxiliary reservoir, and means operatively connecting said valve to said piston rod.

3. In a fluid pressure brake, the combination with a brake cylinder containing a piston having a piston rod, and an auxiliary reservoir from which fluid is supplied to the brake cylinder, of a plurality of chambers, a valve operatively connected to said piston rod for controlling communication between said chambers and the auxiliary reservoir and adapted in the release position of the brake cylinder piston to connect all of said chambers with the auxiliary reservoir for charging said chambers with fluid under pressure and when the brakes are applied to connect one or more of said chambers with the auxiliary reservoir according to the brake cylinder piston travel.

4. In a fluid pressure brake, the combination with an auxiliary reservoir and a brake cylinder having the usual piston and piston rod, of a casing containing a plurality of compartments, a slide valve having positions for connecting one or more of said compartments with the auxiliary reservoir, a bar for operating said valve, and a lever for connecting said bar with the brake cylinder piston rod.

5. In a fluid pressure brake, the combination with a brake cylinder and auxiliary reservoir, of a plurality of normally charged compartments of successively increasing volumes and means operated according to the increase in brake cylinder piston travel for successively connecting said compartments to the auxiliary reservoir.

In testimony whereof I have hereunto set my hand.

WALTER V. TURNER.